US006955798B2

(12) United States Patent  (10) Patent No.: US 6,955,798 B2
Miao  (45) Date of Patent: Oct. 18, 2005

(54) METHOD FOR MANUFACTURING ALUMINUM OXYNITRIDE (ALON) POWDER AND OTHER NITROGEN-CONTAINING POWDERS

(75) Inventor: Weifang Miao, Pittsburgh, PA (US)

(73) Assignee: Nanomat, Inc., N. Huntingdon, PA (US)

( * ) Notice: Subject to any disclaimer, the term of this patent is extended or adjusted under 35 U.S.C. 154(b) by 263 days.

(21) Appl. No.: 10/136,220

(22) Filed: May 1, 2002

(65) Prior Publication Data

US 2005/0118086 A1  Jun. 2, 2005

(51) Int. Cl.$^7$ ............................................. C01B 21/082
(52) U.S. Cl. ......................................................... 423/385
(58) Field of Search ................................ 423/385, 409, 423/411, 412

(56) References Cited

U.S. PATENT DOCUMENTS

| | | | |
|---|---|---|---|
| 4,241,000 A | 12/1980 | McCauley | |
| 4,481,300 A | 11/1984 | Hartnett | |
| 4,686,070 A | 8/1987 | Maguire | |
| 4,720,362 A | 1/1988 | Gentilman | |
| 4,806,330 A | * 2/1989 | Melling et al. | ............. 423/412 |
| 4,866,012 A | * 9/1989 | Silverman | ................... 423/412 |
| 5,075,265 A | 12/1991 | Narula | |
| 5,466,310 A | 11/1995 | Ninham | |

FOREIGN PATENT DOCUMENTS

| | | | |
|---|---|---|---|
| EP | 0590378 | * | 4/1994 |
| JP | 58-135112 | * | 8/1983 |
| JP | 60-200827 | * | 10/1985 |
| JP | 1-192726 | * | 8/1989 |

OTHER PUBLICATIONS

Calko, "Low temperature synthesis of AL-ALN composites from a nanostructure made by controlled magneto-ball milling of AL in ammonia", Journal of Applied Physics, 75 (10), May 15, 1994, pp 4953-4954, 1994 American Institute of Physics.

Yang, "Synthesis of titanium oxynitride by mechanical milling", Journal of Materials Science 28 (1993), pp 5663-5667, 1993 Chapman & Hall.

Martin, "Synthesis and hot pressing of transparent aluminum oxynitride", SPIE vol. 1112 Window and Dome Technologies and Materials (1989), pp 22-24.

Calka, "Direct Synthesis of AL-ALN composites by room temperature magneto ball milling: The effect of milling condition on formation of nanostructures", NanoStructured Materials, vol 6, pp 409-412, 1995 Elsevier Science Ltd.

Yawei, "Carbothermal reduction synthesis of aluminium oxynitride spinel powders at low temperatures", Journal of Materials Science Letters 16 (1997) pp 185-186, 1997 Chapman & Hall.

Yawei, "The formation and stability of gamma-aluminium oxynitride spinel in the carbothermal reduction and reaction sintering processes", Journal of Materials Science 32 (1997) pp 979-982, 1997 Chapman & Hall.

McCauley, "Phase Relations and Reaction Sintering of Transparent Cubic Aluminum Oxynitride Spinel (ALON)", Journal of The American Ceramic Society, vol. 62, No. 9-10 pp 476-479.

Cheng, "Microwave reactive sintering to fully transparent aluminum oxynitride (ALON) ceramics", Journal of Materials Science Letters 20, 2001, pp 77-79, 2001 Kluwer Academic Publishers.

Tseng, "Carbothermal reduction and nitridation of aluminium hydroxide", Journal of Materials Science 31 (1996) pp 3559-3565, 1996 Chapman & Hall.

Yawei, "The formation and stability of gama-aluminium oxynitride spinel in the carbothermal reduction and reaction sintering processes", Journal of Materials Science 32 (1997) pp 979-982, 1997 Chapman & Hall.

Fukuyama, "New Synthetic Method of Forming Aluminum Oxynitride by Plasma Arc Melting", Journal of the American Ceramic Society, 82 (6) pp 1381-87 (1999).

Cheng, "Microwave Synthesis of aluminum oxynitride (ALON)", Journal of Materials Science Letters 18 (1999) pp 1989-1990, 1999 Kluwer Academic Publishers.

* cited by examiner

Primary Examiner—Wayne A. Langel
(74) Attorney, Agent, or Firm—Paul J. Shannan

(57) ABSTRACT

A method of preparing substantially homogeneous aluminum oxynitride powder and other nitrogen-containing powders is provided. Particularly with respect to the AlON powder, the method comprises the steps of milling a mixture of aluminum and aluminum oxide in a nitrogen-containing atmosphere until a milled powder composed of aluminum-nitrogen solid solution and aluminum oxide forms. The next step is heating the milled powder in the presence of an inert gas and keeping it at sufficient temperature for a sufficient heating time to form the substantially homogenous aluminum oxynitride powder. This method is extended to the preparation of other powders by employing appropriate starting materials. The resultant powders are also claimed as part of the instant invention.

14 Claims, No Drawings

METHOD FOR MANUFACTURING ALUMINUM OXYNITRIDE (AlON) POWDER AND OTHER NITROGEN-CONTAINING POWDERS

FEDERAL FUNDING PROVISIONS

This invention was made with Government Support under Contract No. DASG60-01-P-0088 awarded by the Department of Defense (BMDO). The Government has certain rights in this invention.

CROSS REFERENCE TO RELATED APPLICATIONS

Not Applicable.

BACKGROUND

1. Field of the Invention

This invention relates to a method for the manufacture of nitrogen-containing powders used in making durable ceramic compounds, and, in a preferred embodiment, a method producing high-purity gamma-aluminum oxynitride (AlON) powders, which can be used in making durable transparent ceramic components. The resultant powders are also claimed as part of the invention.

2. Description of Prior Art

This invention relates to the manufacture of powders used in making durable ceramic compounds, in particular durable transparent ceramic components. Gamma-aluminum oxynitride (AlON), for example, has attracted much attention recently due to its unique combination of optical, dielectric and mechanical properties. Of particular interest are its potential applications in infrared missile domes, transparent armor systems, supermarket scanner windows, scratchproof watch crystals and lenses, refractories in metallurgical and materials industries, metal vapor lamp envelopes, and high temperature windows to name a few. Other applications will be apparent to those skilled in the art and the preceding list is by no means exhaustive.

In order to make AlON and other nitrogen-containing powders commercially viable, it is important to develop methods to produce high purity and low cost powders that can, for example, be densified to transparency as in the case of AlON. Heretofore, a variety of techniques has been used including the following: solid state reaction, carbothermal nitridation, melting, and chemical vapor disposition. Up until the present invention, the two procedures most commonly used to synthesize AlON and other nitrogen-containing powders were the solid state reaction and carbothermal nitridation methods.

In the specific case of AlON, the solid state reaction route starts with mixing (usually by ball milling) of appropriate mixtures of aluminum nitride and alumina powders. Annealing or calcining the mixtures in nitrogen atmosphere at temperatures usually above 1700° C. for extended times (usually more than four hours) is required for forming AlON powders. In this well-known solid-state reaction method, expensive AlN powders must be used as an initial ingredient. Another inherent limitation is that the $Al_2O_3$ reaction with AlN is sluggish even at high temperatures. Thus, the solid-state reaction method is very time and energy consuming and, due to the sluggishness of the reaction, oxidation can be a problem.

AlON powder has also been alternatively synthesized by a carbothermal nitridation process. In this process, alumina powder is generally mixed with carbon (such as carbon black), and this mixture is then heated in a reactor under nitrogen atmosphere at high temperatures, e.g., 1650–1850° C. The reaction usually takes place via two steps. The first step is the reaction between a portion of alumina, carbon and nitrogen to form aluminum nitride and carbon monoxide. The reaction can occur at 1650–1750° C. The newly formed aluminum nitride then reacts with the remaining alumina at temperatures between 1750–1850° C. to form AlON powder.

Problems with this previous method of carbothermal nitridation include the control of the product stoichiometry. Since reactions only occur at high temperatures (approximately 1800 degrees centigrade), evaporative losses from the charge are likely to be high. Further, the reducing conditions prevailing in a graphite furnace may have a significant influence on the final oxygen to nitrogen ratio in the product powder. AlON powders produced this way often also have some free carbon in the final powder. This impurity is detrimental to the mechanical and, especially, the optical properties of AlON.

In addition to the technical difficulties, limited commercial supply and high cost are other significant hindrances to the widespread application of AlON and other nitrogen containing powders as manufactured by previous methods.

Similar carbothermal nitridation processes have also been used for the manufacturing of other nitrogen-containing compounds, such as SiAlON, TiN, BN, ZrN, HfN, and $Si_3N_4$ Hence, the manufacturing and applications of these nitrogen-containing compounds also suffers from the similar difficulties and limitations as mentioned above.

SUMMARY OF THE INVENTION

These and other problems are solved by the present invention which provides for a new and novel method for producing high purity gamma-aluminum oxynitride powders by milling an admixture of aluminum and aluminum oxide in a nitrogen-containing atmosphere to create milled powders containing Al(N) solid solution and aluminum oxide. The milled powders are then heated in a reaction chamber filled with an inert gas for a sufficient amount of time to form the substantially homogeneous aluminum oxynitride powder. This process can be also used to synthesize other nitrogen-containing compounds, such as SiAlON, TiN, BN, ZrN and $Si_3N_4$, by employing appropriate starting materials. The resultant powders are also claimed in the within invention.

OBJECTS AND ADVANTAGES

It was determined that a new mechanochemical method described more fully herein is less expensive, less time consuming, and more energy efficient than currently known methods of producing the AlON and other nitrogen-containing powders. Other objects and advantages, with respect to AlON, are the lower costs of the starting materials due to the fact that the expensive compound AlN is not a necessary starting ingredient. Further, the powders resulting from the instant method are much more pure than those resulting from a carbothermal reaction because there is no chance of the final product containing carbon. Carbon adversely affects the optical properties of the ceramic made from the resultant powders. Due to the nature of the new mechanochemical method, neither oxidation nor evaporation is a prohibitive problem.

Further objects and advantages of my invention will become apparent from a consideration of the ensuing description by those skilled in the art.

DESCRIPTION OF INVENTION—PREFERRED EMBODIMENT

The present invention produces a high-purity homogeneous cubic or gamma aluminum oxynitride powder or other nitrogen-containing powders. These powders may be preferably prepared by the following method:

A. The Milling Step

For AlON, the starting materials for the milling step are aluminum (Al) powder (Alfa Aesar, 99.8%, 45–425 μm) and $Al_2O_3$ powder (Buehler, 99.98%, 85% gamma alumina, 15% alpha alumina, specific surface area 82 $m^2/g$). The milling process is preferably carried out in a Union Process 01HD laboratory attritor equipped with a specially designed cover so that the milling can be performed in the desired atmosphere.

Milling is preferably carried out in an ammonia atmosphere. The milling occurs in a 750 ml stainless steel tank and 1000 g of 5 mm zirconia balls are used. The ratio of the mass of the balls to the mass of the starting powders is normally 25:1. Rotation speed of the shaft in the attritor is 600 rpm and the sufficient milling time is 40 hours. Once milling is complete, the grain size of the milled particles is in the range of 5 to 30 nanometers, which suggests that the milled powder is nanostructured.

B. The Heating (or Annealing or Calcining) Step

In the preferred embodiment, heating, annealing or sintering is then carried out in a high temperature furnace in an atmosphere of nitrogen. Prior to heating, the heating chamber is evacuated and filled with nitrogen a few times. During the heating step, nitrogen pressure is kept at approximately 2 pounds per square inch higher than ambient pressure. The samples are then naturally cooled in the furnace. Best results and highest purity have been obtained with an annealing time (or sufficient heating time) of one to two hours and a temperature in the range of 1650 to 1700 degrees Centigrade, although other temperatures and times may produce favorable results as well.

It is understood that the above-described embodiments of the invention are illustrative only and modifications thereof may occur to those skilled in the art. Accordingly, it is desired that this invention is not to be limited to the embodiments disclosed herein but is to be limited only as defined by the appended claims and their legal equivalents.

I claim:

1. A method for preparing gamma-aluminum oxynitride powder comprising:
   providing an admixture of aluminum powder and γ-aluminum oxide powder;
   milling said admixture in a nitrogen-containing atmosphere for a sufficient milling time to form a milled powder containing a solid solution and aluminum oxide; and
   heating said milled powder in the presence of a nitrogen-containing gas to a sufficient temperature for a sufficient heating time to cause the milled powder to react to provide gamma-aluminum oxynitride powder.

2. A method of claim 1, wherein the admixture contains an γ-aluminum oxide content of about 75 wt % to about 85 wt %.

3. A method of claim 1 wherein milling is performed in an ammonia atmosphere.

4. A method of claim 2, wherein milling is performed in an ammonia atmosphere.

5. A method of claim 1, wherein the sufficient milling time is greater than nine hours.

6. A method of claim 4, wherein the sufficient milling time is greater than nine hours.

7. A method of claim 1, wherein the sufficient temperature is about 1600 to about 2140° C.

8. A method of claim 6, wherein the sufficient temperature is about 1600 to about 2140° C.

9. A method of claim 1, wherein the sufficient heating time is about 30 to about 120 minutes.

10. A method of claim 8, wherein the sufficient heating time is about 30 to about 120 minutes.

11. A method of claim 1 wherein the milling step is preformed at a heightened pressure.

12. A method of claim 10 wherein the milling step is performed at a heightened pressure.

13. A method of claim 10 wherein the heightened pressure is about one to two pounds per square inch higher than ambient pressure.

14. A gamma-aluminum oxynitride powder prepared using the method of claim 1.

* * * * *